US012565745B2

(12) United States Patent
Zwierzykowski

(10) Patent No.: US 12,565,745 B2
(45) Date of Patent: Mar. 3, 2026

(54) ARTICULATING EXPANDABLE BARRIER

(71) Applicant: Peter Zwierzykowski, San Diego, CA (US)

(72) Inventor: Peter Zwierzykowski, San Diego, CA (US)

(73) Assignee: Peter Zwierzykowski, San Diego, CA (US)

( * ) Notice: Subject to any disclaimer, the term of this patent is extended or adjusted under 35 U.S.C. 154(b) by 581 days.

(21) Appl. No.: 17/665,236

(22) Filed: Feb. 4, 2022

(65) Prior Publication Data

US 2022/0251790 A1 Aug. 11, 2022

Related U.S. Application Data

(60) Provisional application No. 63/146,417, filed on Feb. 5, 2021.

(51) Int. Cl.

| | |
|---|---|
| ***E01F 13/02*** | (2006.01) |
| ***E06B 9/06*** | (2006.01) |
| *E06B 9/00* | (2006.01) |

(52) U.S. Cl.

CPC ............ *E01F 13/02* (2013.01); *E06B 9/0615* (2013.01); *E06B 2009/002* (2013.01)

(58) Field of Classification Search

CPC .......... E06B 9/06; E06B 9/063; E06B 9/0623; E06B 9/0607; E06B 9/0615; E06B 9/0646; E06B 9/0653; E06B 9/0661; E06B 2009/002; E01F 13/02; E01F 13/022; E01F 9/668; E01F 9/692

See application file for complete search history.

(56) References Cited

U.S. PATENT DOCUMENTS 67,143 A * 7/1867 Snead .................... E06B 9/0661 160/136
351,084 A * 10/1886 Wilson .................. E06B 9/0661 160/162

(Continued)

FOREIGN PATENT DOCUMENTS

WO 9638647 A1 12/1996
WO 2012107335 A1 8/2012

OTHER PUBLICATIONS

Barrier Group (2015) "Port-A-Guard Maxi-Expandable Barriers", Brochure, 4 Pages.

(Continued)

*Primary Examiner* — Johnnie A. Shablack
(74) *Attorney, Agent, or Firm* — FisherBroyles, LLP

(57) ABSTRACT

Provided is an adjustable barrier having a central hinge having a cylindrical post and an axis of rotation; a first expandable section coupled to the cylindrical post of the central hinge by at least a first connector; a second expandable section coupled to the cylindrical post of the central hinge by at least a second connector; and a hinge lock. At least one of the first and second expandable sections is configured to articulate around the axis of rotation of the central hinge forming an articulation angle between the first and second expandable sections. When the first and second expandable sections are aligned within a single vertical plane, a spring button of the cylindrical post is received within an aperture of at least one of the first and second connectors preventing articulation around the axis of rotation.

19 Claims, 12 Drawing Sheets

(56) References Cited

U.S. PATENT DOCUMENTS

| | | | | | |
|---|---|---|---|---|---|
| 417,898 | A * | 12/1889 | Bataille | B66B 13/08 | 160/145 |
| 514,663 | A * | 2/1894 | Pitt | E06B 9/0661 | 160/136 |
| 685,247 | A * | 10/1901 | Borrman | E04H 17/063 | 256/72 |
| 763,604 | A * | 6/1904 | Guerin | E06B 9/24 | 160/137 |
| 871,905 | A * | 11/1907 | Acers | E06B 9/54 | 160/159 |
| 936,812 | A * | 10/1909 | Robinson | E06B 9/0661 | 160/136 |
| 2,348,561 | A * | 5/1944 | Mutch | E06B 9/0623 | 160/145 |
| 3,145,766 | A * | 8/1964 | Wickham | E01F 13/02 | 160/136 |
| 3,297,076 | A * | 1/1967 | Udin | E06B 9/0661 | 160/161 |
| 3,499,398 | A * | 3/1970 | Murray | B65D 19/385 | 108/53.5 |
| 3,605,851 | A * | 9/1971 | Miles et al. | E04B 2/74 | 52/239 |
| 4,053,079 | A * | 10/1977 | Karpisek | B65D 19/06 | 217/43 A |
| 4,558,713 | A * | 12/1985 | Hagler | E04H 15/34 | 135/159 |
| 4,573,109 | A * | 2/1986 | Lack | F21V 21/116 | 404/6 |
| 5,282,606 | A * | 2/1994 | Praiss | E04H 4/06 | 256/26 |
| 5,499,646 | A * | 3/1996 | Lee | E04H 15/28 | 135/96 |
| 5,515,899 | A * | 5/1996 | Chan | E06B 11/02 | 160/206 |
| 5,704,592 | A * | 1/1998 | White | E01F 13/022 | 256/25 |
| 5,850,922 | A * | 12/1998 | Fraser | B65D 5/5054 | 206/349 |
| 5,860,250 | A * | 1/1999 | Hill | E06B 9/02 | 49/55 |
| 6,675,723 | B2 * | 1/2004 | Sukeva | B65D 11/1873 | 108/55.1 |
| 6,783,012 | B2 * | 8/2004 | Webb | A47F 1/12 | 211/187 |
| 7,152,372 | B2 * | 12/2006 | Cheng | E06B 9/04 | 49/55 |
| 7,422,048 | B2 * | 9/2008 | Andersen | E06B 9/00 | 49/55 |
| 7,887,029 | B2 * | 2/2011 | Flannery | E06B 9/06 | 256/65.16 |
| 7,971,733 | B2 * | 7/2011 | Ponto | B65D 19/44 | 108/55.1 |
| 8,863,811 | B2 * | 10/2014 | Yates | E06B 9/0661 | 160/136 |
| 8,944,415 | B2 * | 2/2015 | Sirotin | E04H 17/185 | 256/26 |
| D732,259 | S * | 6/2015 | Lockwood | D34/26 | |
| 10,472,883 | B2 * | 11/2019 | Zwierzykowski | E06B 9/0615 | |
| 10,920,485 | B2 * | 2/2021 | Zwierzykowski | E06B 9/0615 | |
| 10,935,070 | B2 * | 3/2021 | Klein | F16C 11/0695 | |
| 11,066,870 | B1 * | 7/2021 | Flannery | A01K 1/035 | |
| 11,553,804 | B2 * | 1/2023 | Matsumoto | F16B 7/18 | |
| 11,649,667 | B2 * | 5/2023 | Zwierzykowski | E01F 13/022 | 49/198 |
| 12,146,338 | B1 * | 11/2024 | Li | E04H 17/18 | |
| 2001/0020903 | A1 * | 9/2001 | Wang | E01F 9/688 | 340/908 |
| 2003/0197165 | A1 * | 10/2003 | Perelli | E01F 13/02 | 256/26 |
| 2004/0079930 | A1 * | 4/2004 | Aubin | E01F 13/022 | 256/1 |
| 2004/0188667 | A1 * | 9/2004 | Ray | E04H 17/18 | 256/67 |
| 2005/0023083 | A1 * | 2/2005 | Reimer | E01F 13/02 | 182/186.3 |
| 2006/0076544 | A1 * | 4/2006 | Kurple | E01F 9/654 | 256/26 |
| 2006/0081826 | A1 * | 4/2006 | Cheng | E06B 9/04 | 256/22 |
| 2007/0210293 | A1 * | 9/2007 | Cheng | E04H 17/18 | 256/26 |
| 2007/0245631 | A1 * | 10/2007 | Yi | E06B 9/0661 | 49/55 |
| 2009/0241809 | A1 * | 10/2009 | Head | B66C 1/10 | 220/23.91 |
| 2010/0083577 | A1 | 4/2010 | Flannery et al. | | |
| 2011/0162280 | A1 * | 7/2011 | Yu | H02S 20/00 | 49/34 |
| 2012/0100940 | A1 * | 4/2012 | Hajarian | A63B 63/004 | 473/476 |
| 2012/0285099 | A1 * | 11/2012 | Yates | E06B 9/0623 | 49/503 |
| 2015/0101250 | A1 * | 4/2015 | Marsden | E06B 9/0623 | 49/55 |
| 2017/0342768 | A1 | 11/2017 | Zwierzykowski | | |
| 2020/0032579 | A1 | 1/2020 | Zwierzykowski | | |
| 2021/0381307 | A1 | 12/2021 | Zwierzykowski | | |
| 2022/0251790 | A1 * | 8/2022 | Zwierzykowski | E01F 13/02 | |
| 2023/0392437 | A1 * | 12/2023 | Zwierzykowski | E06B 9/00 | |

OTHER PUBLICATIONS

Cisco (2016) “Mobile Barrier Gate 6' Wide Adder”, Retrieved from:www.cisco-eagle.com/catalog/product/182891/mobile-barrier-gate-6-wide-adder, 7 Pages.

Desimone (2016) “Barrier Gates, Collapsible Gates, Door Gates, Folding Gates, Steel Folding Gates”, Retrieved from: www.bondorseals.com/more_info/galvanized_barrier_gates/galvanized_barrier_gates.htm, 3 Pages.

No Author (2016) “Low Portable Folding Steel Security Gates—a.k.a. Scissor or Accordion Gates”, Blockader Gates, Retrieved from: blockadergates.com/low-portable-folding-steel-security-gates/, 5 pages.

Pinterest (2017) “Folding Security Gates”, Retrieved from: www.pinterest.com/xinger3988/folding-security-gates/, 7 Pages.

Portable Gates (2007) “Portable Security Gates, Gates Roll Away When Not in Use”, Heavy-Duty Portable Security Gates, 2 Pages.

* cited by examiner

ARTICULATING EXPANDABLE BARRIER

CROSS-REFERENCE TO RELATED APPLICATION

This application claims the benefit of priority under 35 U.S.C. § 119(e) to U.S. Provisional Patent Application Ser. No. 63/146,417, filed Feb. 5, 2021. The disclosure of the provisional application is incorporated by reference in its entirety.

FIELD

The subject matter described herein relates to expandable barriers having portions that articulate relative to one another via a hinge.

BACKGROUND

Temporary barriers are often used to delineate an area against vehicle or personal entry often incorporate lattice type structure capable of expanding in the vertical plane.

SUMMARY

In some aspects there are provided systems, devices, and methods for temporarily and/or customizably providing barrier function.

In some aspects, there is provided an adjustable barrier having a central hinge having a cylindrical post having a spring button and an axis of rotation; a first expandable section coupled to the cylindrical post of the central hinge by at least a first connector; a second expandable section coupled to the cylindrical post of the central hinge by at least a second connector; and a hinge lock. At least one of the first and second expandable sections is configured to articulate around the axis of rotation of the central hinge forming an articulation angle between the first and second expandable sections. When the first and second expandable sections are aligned within a single vertical plane, the spring button is received within an aperture of at least one of the first and second connectors preventing articulation around the axis of rotation.

The cylindrical post can extend upright between the first and second expandable sections. The first connector and the second connector each can include a generally tubular knuckle and a leaf extending laterally from the knuckle. Each knuckle can have an inner diameter sized to receive an outer diameter of the cylindrical post such that the knuckle is received over the cylindrical post. Each leaf can be configured to couple to its respective expandable section. The articulation angle can be between 0 degrees at which the first and second expandable sections is folded over completely against one another to about 180 degrees at which the first and second expandable sections are unfolded relative to one another and extend within a single vertical plane.

The barrier can be free-standing. The barrier can include a first footing coupled to a lower end of the first expandable section, a second footing coupled to a lower end of the second expandable section, and a third footing coupled to a lower end of the cylindrical post. At least one of the first, second, and third footings can be removable from the barrier. At least one of the first, second, and third footings can incorporate casters. At least one of the first, second, and third footings can be adjustable in height. The adjustment in height can be via a telescoping spring button lock mechanism.

The first expandable section can include a first multiplicity of slats hingedly interconnected in a scissoring lattice-type structure configured to expand outward from a compact, collapsed narrow configuration to an expanded, wide configuration. The second expandable section can include a second multiplicity of slats hingedly interconnected in a scissoring lattice-type structure configured to expand outward from a compact, collapsed narrow configuration to an expanded, wide configuration. The barrier can include a third expandable section coupled to the second expandable section by a second hinge.

The barrier can further include a sign or a holder for a sign that is coupled to at least one of the first and the second expandable sections so as to reside within a space between the multiplicity of slats. The sign or sign holder can be obscured by the multiplicity of slats when the at least one expandable is in the compact, collapsed narrow configuration. The sign or sign holder can be revealed when the at least one expandable section is in the expanded, wide configuration.

BRIEF DESCRIPTION OF THE DRAWINGS

These and other aspects will now be described in detail with reference to the following drawings. Generally speaking the figures are not to scale in absolute terms or comparatively, but are intended to be illustrative. Also, relative placement of features and elements may be modified for the purpose of illustrative clarity.

DETAILED DESCRIPTION

Figure 1:
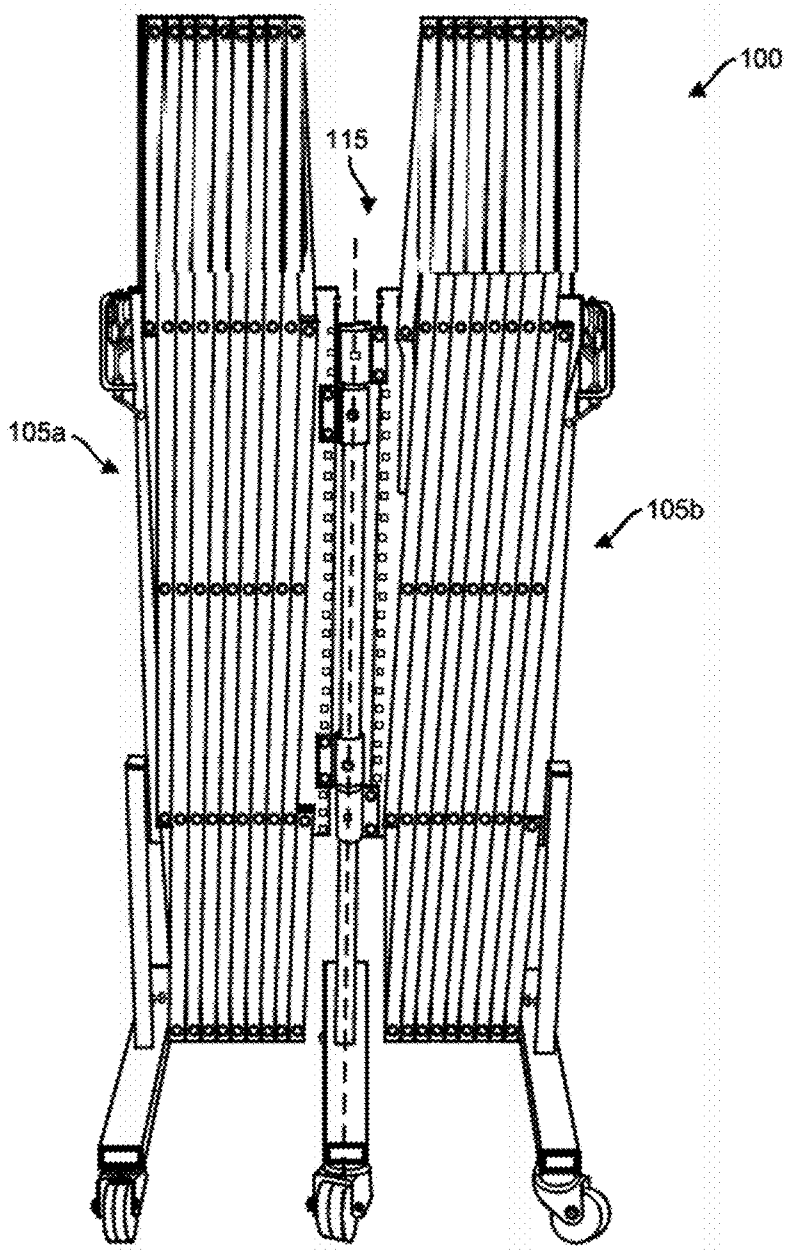
FIG. 1 is an implementation of the barrier in a collapsed configuration.

Described herein are temporary barriers that are expandable and collapsible in the vertical plane that also incorporate a hinge allowing for articulation of the expandable/collapsible portions relative to one another providing more flexibility. The temporary barriers described herein are particularly useful to block off a defined portion of an area, such as a portion of an aisle in a retail establishment.

It should be appreciated that although the barriers herein are described in the context of their use for safety, the barriers are usable for any number of purposes. In some implementations, the barriers described herein are usable for marking out a ground or floor area in which there is a safety hazard or in which maintenance or repair work is being carried out. In particular, the barriers described herein are useful in retail aisles where only a portion of the width of the aisle is barricaded and the remainder of the width of the aisle is open to the flow of traffic. The barriers described herein can be used for both outdoor and indoor applications. In some implementations, the barriers described herein are useful for indoor areas including residential buildings, retail buildings such as shopping malls, or warehouse "box" stores, other public venues such as maintenance locations, sporting venues, and other public venues or locations. It should also be appreciated that relative, directional language and terms regarding orientation such as "right," "left," "upper," "lower," "inner," "outer," "backward," "forward," "upward," "downward," "inward," "outward" and the like are used throughout merely for convenience for description and are not intended to be limiting.

Turning to the drawings, FIGS. 1-4 illustrate a first implementation of a temporary barrier 100. The barrier 100 can incorporate at least a first expandable section 105*a* coupled to at least a second expandable section 105*b* by a central hinge 115 allowing for the expandable sections to articulate relative to one another around an axis of rotation A. The axis of rotation A can extend through a cylindrical post of the central hinge 115.

The expandable sections 105*a*, 105*b* can incorporate a multiplicity of slats 120 hingedly interconnected in a scissoring lattice-type structure as is known in the art. A variety of expandable structure configurations are considered herein so long as the expandable sections are readily expanded outward from a compact, collapsed narrow configuration shown in FIG. 1 to an expanded, wide configuration shown in FIG. 4. In the narrow configuration edges of the slats 120 can abut one another such that each of the slats 120 extends generally parallel to one another and perpendicular to the floor. In the expanded, wide configuration the edges of the slats 120 are separated from one another forming an open lattice structure to achieve a maximum extension. Although the barrier 100 shown in the figures incorporates an open lattice the barriers described herein can also incorporate a closed structure such that the space between the slats 120 is covered by a material such as a fabric, plastic, or other material. Also, the relative thickness of each of the slats 120 can vary providing differing degrees of privacy and protection on either side of the barrier 100. The barrier 100 may include more than two expandable sections 105, including 3, 4, 5 or more sections configured to be pivotably attached to one another for creating an enlarged space of various geometries. Further, the materials, weights, and overall size of the barrier components described herein can vary to satisfy different user preferences, such as more robust, heavy-duty metal materials such as steel for some implementations and less robust, lighter-weight, plastic materials for other implementations.

As mentioned above, the first expandable section 105*a* can articulate relative to the second expandable section 105*b* around the central hinge 115 axis of rotation A forming an articulation angle between the first and second expandable sections 105*a*, 105*b*. The central hinge 115 can include at least a first connector 125*a* coupled to the first expandable section 105*a* and at least a second connector 125*b* coupled to the second expandable section 105*b* (see FIGS. 5-7). The central hinge 115 can also include a cylindrical post 130 extending upright between the first and second expandable sections 105*a*, 105*b* that is configured to couple to each of the connectors 125*a*, 125*b* forming the hinge 115 (see FIG. 5). The axis of rotation A extends through a center of the cylindrical post 130.

Figure 5:
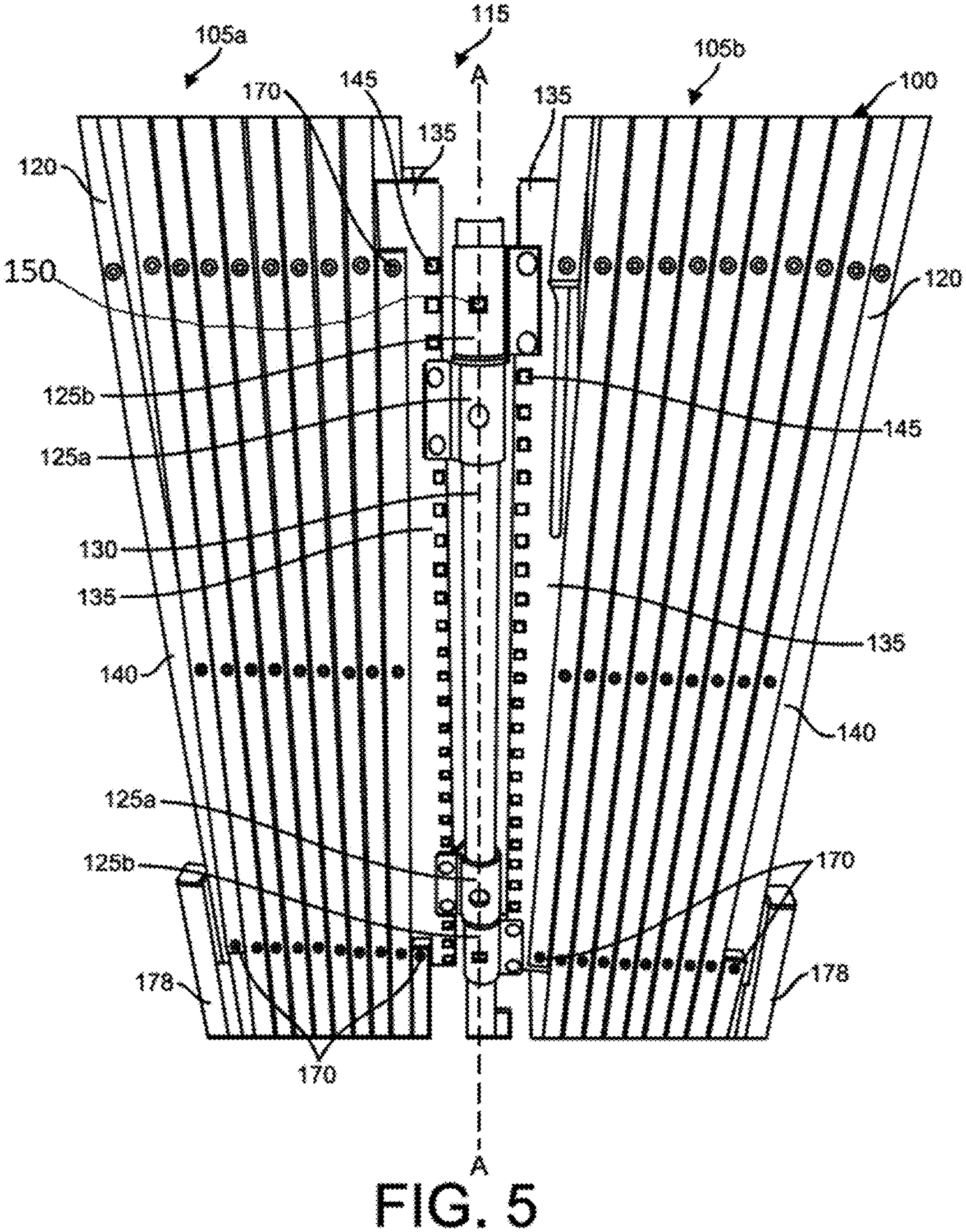
FIG. 5 is a close-up view of the barrier of FIG. 1.

Each expandable section 105 includes at least one connector 125, but can incorporate more than one connector 125. For example, each expandable section 105*a*, 105*b* can include two connectors 125 such that there are two connections points or hinge elements formed between the expandable sections 105*a*, 105*b*. FIG. 5, for example, shows one hinge element formed near a lower end of the barrier 100 and a second hinge element formed near an upper end of the barrier 100, each hinge element incorporating first and second connectors 125*a*, 125*b* and at least a region of the cylindrical post 130. The connector 125*a* of the first expandable section 105*a* can be positioned on the post 130 such that its lower edge 132 is adjacent an upper edge 133 of the connector 125*b* of the second expandable section 105*b* forming an articulating hinge element near a lower end region of the barrier 100. Another connector 125*a* of the first expandable section 105*a* can be positioned on the post 130 such that its upper edge 133 is adjacent a lower edge 132 of the connector 125*b* of the second expandable section 105*b* forming an articulating hinge element near an upper end region of the barrier 100. In other implementations, the connectors 125*a* of the first expandable section 105*a* interdigitate with the connectors 125*b* of the second expandable section 105*b*. The relative number and arrangement of connectors 125 can vary. Although the central hinge 115 is described as having a particular mechanical configuration herein other configurations of hinges are considered herein including, but not limited to a barrel hinge, butt hinge, flush hinge, continuous hinge, piano hinge, etc.

Figure 6:
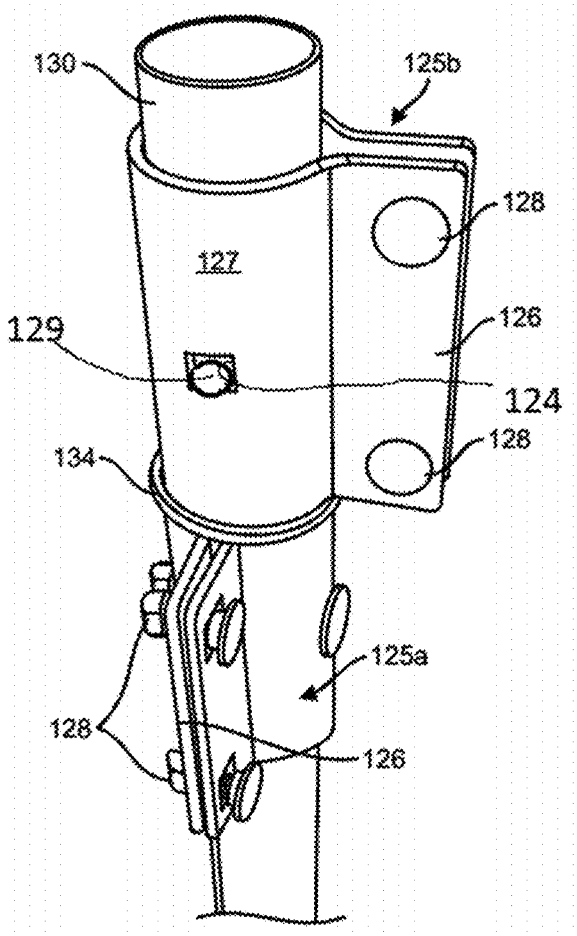
FIG. 6 is a detailed view of a portion of the barrier of FIG. 1.
Figure 7:
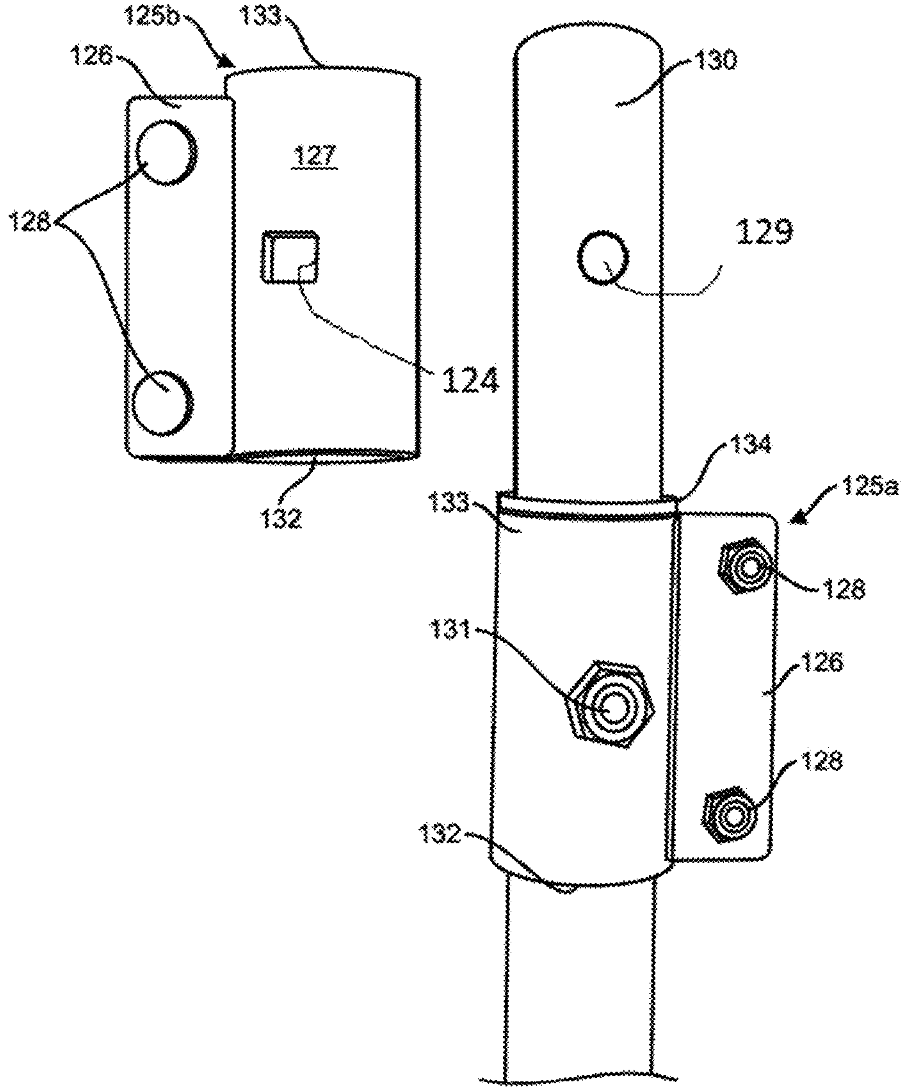
FIG. 7 is a partially exploded view of the portion of FIG. 6.
Figure 8:
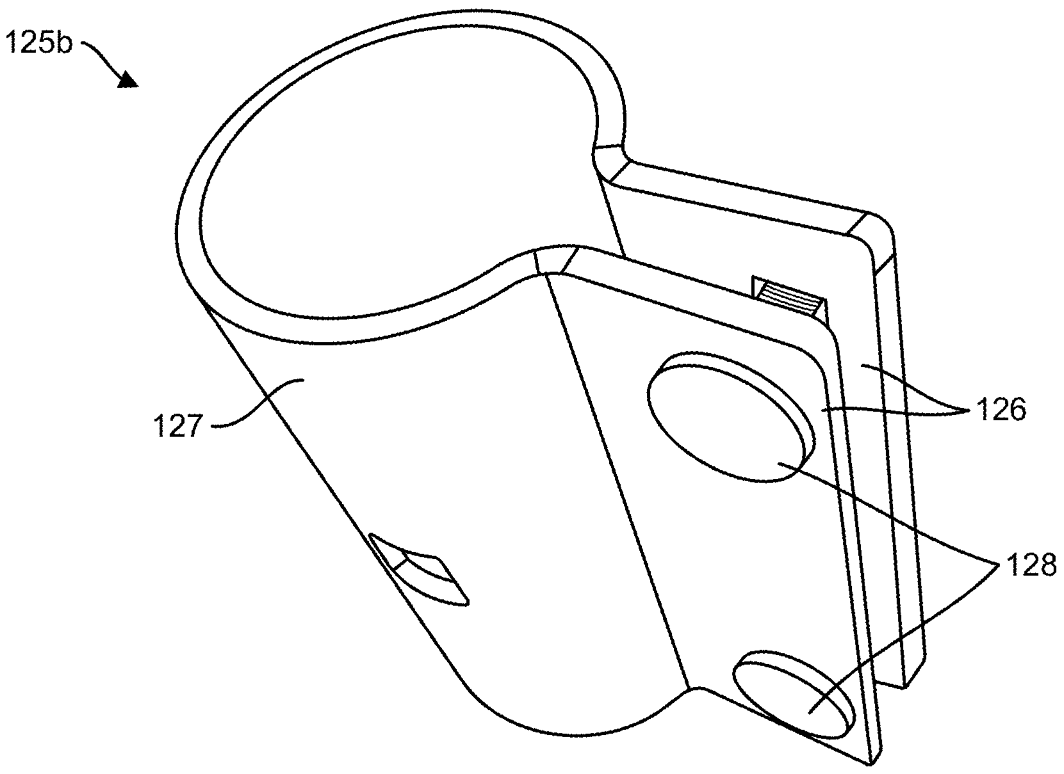
FIG. 8 is a perspective view of a connector from FIG. 6.
Figure 9:
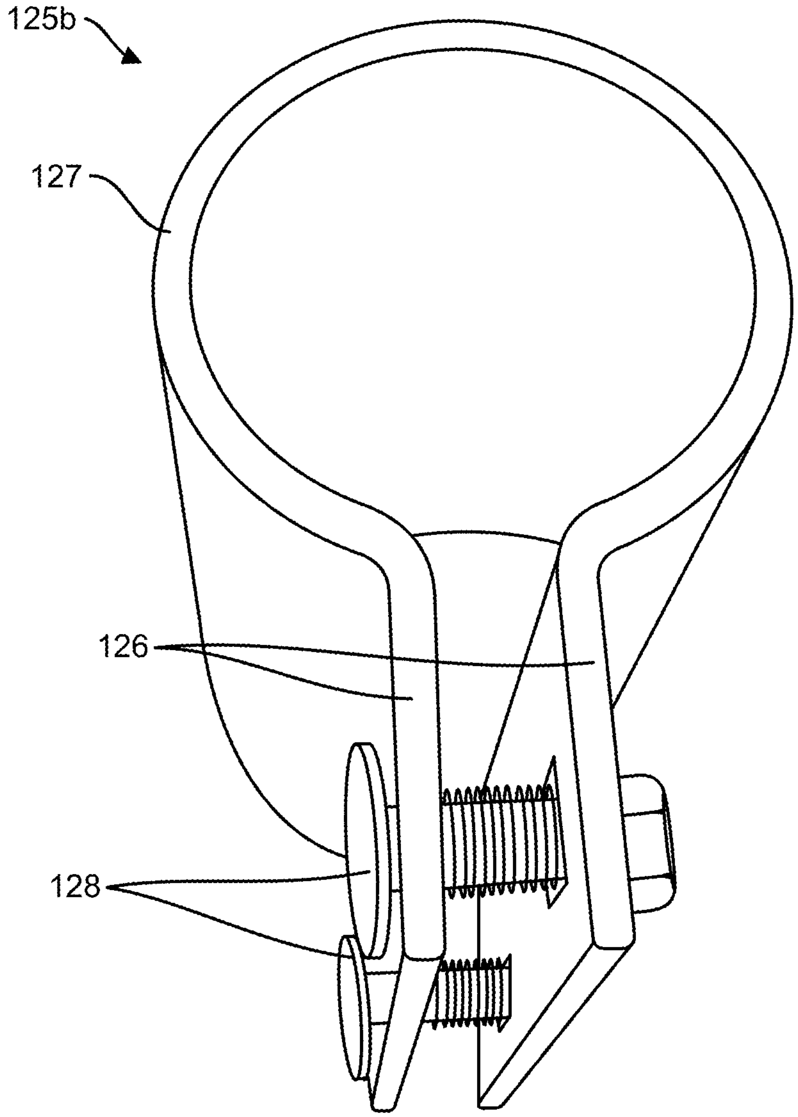
FIG. 9 is a top perspective view of the connector from FIG. 8.

Now with respect to FIGS. 6-9, each connector 125 can be a generally tubular structure having a leaf 126 extending outward laterally from a knuckle 127. The leaf 126 of the connector 125 is configured to couple with the expandable section 105, as will be described in more detail below, and the tubular knuckle 127 is configured to couple with the post 130. The inner cylindrical surface of the tubular knuckle 127 has an inner diameter sized to receive an outer diameter of the outer cylindrical surface of the post 130 such that the tubular knuckle 127 can be received over the post 130 and the connectors 125 and the post 130 are coaxially aligned. The tolerance between the inner surface or inner diameter of the tubular knuckle 127 and outer surface or outer diameter of the post 130 is such that the connector 125 is readily pivotable relative to the post 130, but not too loose so as to affect a smooth articulating movement around the axis of rotation A. At least one or both of the connectors 125*a*, 125*b* can be moveably coupled to the post 130 such that at least one or both of the expandable sections 105*a*, 105*b* can rotate about the post 130 forming various articulation angles relative to one another. In some implementations, the tubular knuckles 127 of one or both of the connectors 125*a*, 125*b* is attached to the post 130 such that, when desired, it does not rotate relative to the post 130. FIG. 7 shows connector 125*a* inserted over the post 130 and fixedly attached to the post 130 by a coupling 131, such as a bolt or other coupling element extending through an aperture 124 in the knuckle 127 of the connector 125*a* such that the connector 125*a* does not rotate relative to the post 130. The coupling between the post 130 and the connector 125 can form an actuatable hinge lock 150 that allows a user to quickly and easily unlock the expandable sections 105*a*, 105*b* so that they may articulate relative to one another, which will be described in more detail below.

The adjacent edges of the connectors 125 forming each hinge element can incorporate a coating or covering allowing for smooth pivoting movements between them. Alternatively, as best shown in FIGS. 6-7 a washer 134 or other elements between the connectors 125 can be incorporated into the hinge elements for smooth pivoting movements of the expandable sections.

Again with respect to FIGS. 5-9, each of the connectors 125 also includes a connection leaf 126 configured to couple with its respective expandable section 105. The connection leaf 126 can be an outwardly-extending planar portion having at least one aperture extending through it. As mentioned previously, each expandable section 105*a*, 105*b* includes a multiplicity of slats 120 that extend between an inner upright 135 and an outer upright 140 (see FIG. 5). The inner upright 135 can be a generally rectangular, planar piece having a first elongate edge oriented towards and moveably coupled to the scissoring slats 120 and a second elongate edge oriented towards the central post 130 and having a plurality of openings 145. When the tubular knuckle 127 of the connector 125 is positioned over the central post 130, the at least one aperture extending through the connection leaf 126 aligns with an opening 145 of the inner upright 135 such that a coupling element 128 can be received therethrough. The coupling element 128 can be a rivet, screw, bolt, or other component configured to clamp the connector 125 to its respective expandable section 105. In some implementations, the connection leaf 126 of the connector 125 is formed by a pair of opposing flanges configured to receive the inner upright 135 therebetween (best shown in FIGS. 8-9). The coupling element(s) 128 extends through a first aperture on a first flange, an opening 145 of the inner upright 135 and a second aperture on the second flange such that the inner upright 135 and connection leaf 126 are coupled together by the coupling element 128. In some implementations, the opposing flanges each have two apertures configured to receive two coupling elements 128.

The barrier 100 can incorporate a hinge lock 150. The hinge lock 150 can maintain the two expandable sections 105*a*, 105*b* aligned within a single vertical plane. The hinge lock 150 can engage a portion of the inner uprights 135 of each of the sections 105*a*, 105*b* locking them into fixed relative position and preventing articulation around the axis of rotation of the hinge 115 as described in U.S. Pat. No. 10,472,883, which is incorporated herein.

The coupling between the post 130 and the connector 125 can form an actuatable hinge lock 150 that allows a user to quickly and easily unlock the expandable sections 105*a*, 105*b* so that they may articulate relative to one another. The cylindrical post 130 extending upright between the first and second expandable sections 105*a*, 105*b* can incorporate a spring button 129 sized to insert through a corresponding aperture 124 in the knuckle 127 of at least one of the connectors 125*a*, 125*b* when the expandable sections 105*a*, 105*b* are within the same plane. A user can urge the spring button 129 inward so that the connector 125*b* can rotate around axis A relative to the post 130 and fold the expandable sections 105*a*, 105*b*. The user can articulate the expandable sections 105*a*, 105*b* into one or more selectable positions relative to one another using the hinge lock 150. For example, the sections 105*a*, 105*b* can be held within the same plane by the hinge lock 150. The sections 105*a*, 105*b* can be held by the hinge lock 150 into a fully folded configuration flat against one another. The sections 105*a*, 105*b* can also be folded into any of a variety of angles relative to one another by the hinge lock 150. The post 130 can have more than a single spring button 129 around its circumference and/or the knuckle 127 can have more than a single aperture 124 around its circumference so that as the post 130 and the knuckle 127 are twisted relative to one another different locking configurations can be achieved. Preferably, the post 130 has a single spring button 129 and the knuckle 127 has a plurality of apertures 124. The knuckle 127 can include just 1 aperture 124 so that only a single relative position around the hinge 115 can be locked. The knuckle 127 can include 2 apertures 124 so that two relative positions around the hinge 115 can be selected and locked, for example, fully expanded and fully folded. The knuckle 127 can include 3, 4, or more apertures 124 so that 3, 4 or more relative positions around the hinge 115 can be selected and locked.

As mentioned above, each expandable section 105 includes a multiplicity of slats 120 that extend between the inner upright 135 and the outer upright 140. The inner upright 135 can couple to a first slat pair near a lower end of the first edge by a first coupling 170 and to a second slat pair near an upper end of the first edge by a second coupling 170. The couplings 170 between the slat pairs and the inner upright 135 are configured to undergo scissor action, like the couplings between the slats 120 themselves. The first edge oriented towards the scissoring slats 120 can incorporate an elongated slot near the upper end within which the coupling 170 can be received. This elongated slot allows for the coupling 170 to slide up and down within the slot depending on expansion of the expandable section 105 such that when the expandable section 105 is in the narrow configuration, the coupling 170 is positioned at an upper end of the slot and when the expandable section 105 is in the wide configuration, the coupling 170 slides down away from the upper end of the slot near a lower end of the slot. A mechanism can be incorporated to limit expansion, such as a bolt or other feature. Further, the couplings described herein can vary including, but not limited to bolts, screws, pins or other mechanisms.

Again with respect to FIG. 5, the outer upright 140 can be a generally elongate element coupled to a first slat pair near a lower end by a first coupling 170 and to a second slat pair near an upper end by a second coupling 170. The couplings 170 between the slat pairs and the outer upright 140 are configured to undergo scissor action. The outer upright 140 can provide a surface for a user to grasp the expandable section 105 without risk of pinching their fingers when the sections 105 are expanded. Additionally, the outer upright 140 can incorporate one or more handle elements 138 (see FIG. 1) to aid in grasping and/or expanding the sections 105 of the barrier 100.

The barrier 100 can be a free-standing barrier. In some implementations, a base or footing 175 can be coupled to lower ends of the expandable sections such as each of the outer uprights 140 to support the barrier and prevent it from tipping during use. A footing 175 can also be coupled to a lower end of the central post 130. The footing 175 can be removably or permanently coupled to the lower end of the outer uprights 104 and post 130. The footing 175 can be adjustably coupled to the lower end of the outer uprights 104 and/or post 130. A rod 177 of the footing 175 can extend upwardly into a correspondingly-shaped receiver element 178 near a lower end region of the outer uprights 140 or a lower end region of the central post 130. The receiver element 178 and rod 177 can couple together in a telescoping fashion so that the extension of rod 177 relative to receiver element 178 can be manually adjusted by a user and locked to achieve a desired position. The arrangement of the telescoping components relative to one another can vary as can the configuration of the locking adjustors to extend and retract the telescoping components. The adjustment can incorporate any of a variety of locking adjustments including clutch lock, split collar lock, cam lock, spring button lock, snap lock, set knob, or combinations thereof. The height settings can be distinct including 1, 2, 3, 4, 5 or more height settings or can be an adjustment so that a user may select any relative position between the telescoping components.

Figure 10:
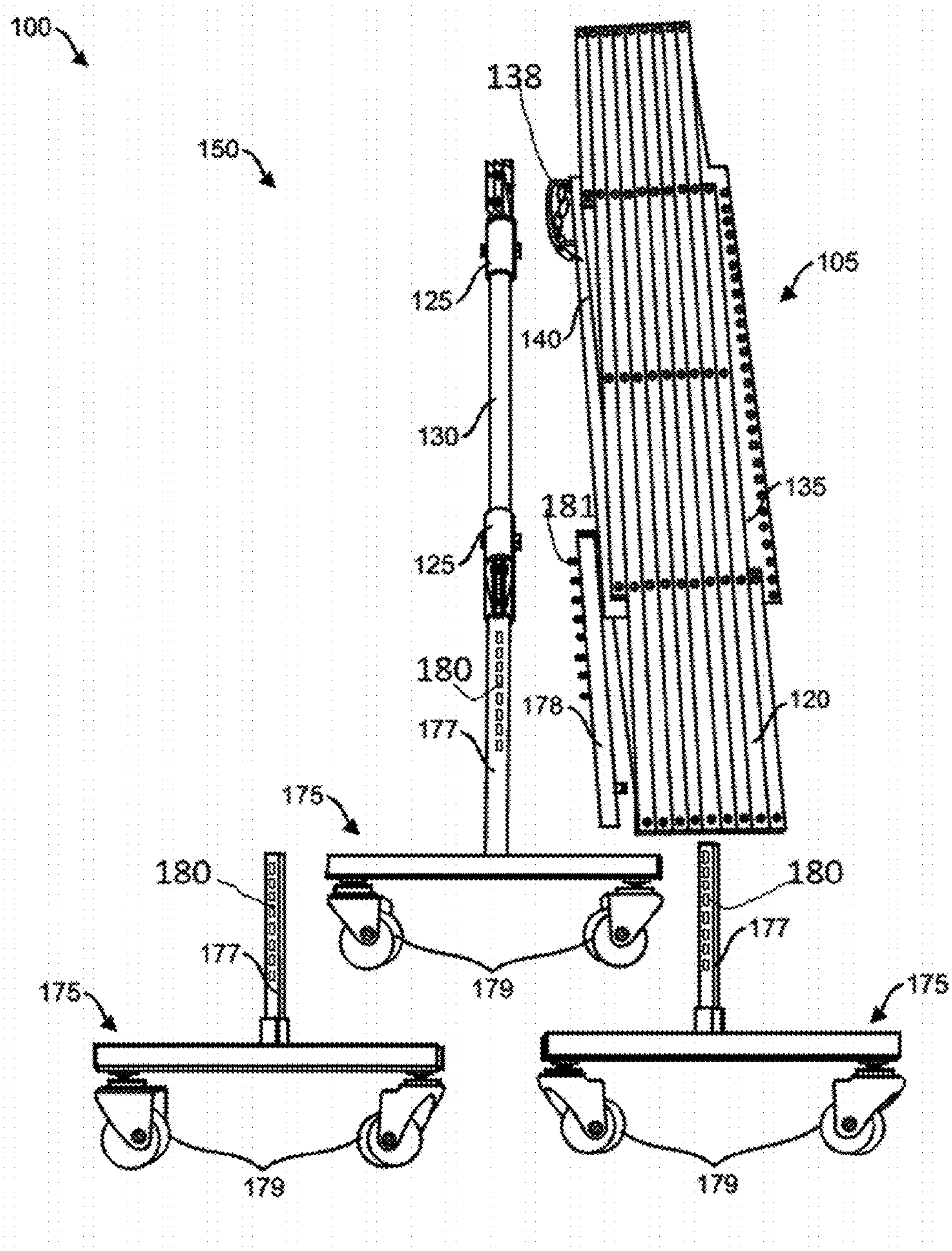
FIG. 10 is an exploded view of the barrier of FIG. 1.

FIG. 10 shows the height adjustment can incorporate a spring button lock adjustment. The receiver element 178 can be a hollow component with a channel extending through at least a portion of its length. One or more apertures 180 can extend through one or more of walls of the receiver element 178 into the channel. The rod 177 sized and shaped to be received within the channel of the receiver element 178 can incorporate one or more spring buttons 181 sized and shaped to mate with and extend through the one or more apertures 180 as the rod 177 inserts within the receiver element 178. The spring buttons 181 are biased outward to project through the apertures 180 and can be urged inward, for example, by a user so that the rod 177 may slide further into (or out from) the channel. Urging the rod 177 deeper into the receiver element 178 decreases the height of the footing 175 while withdrawing the rod 177 out from the channel of the receiver element 178 increases the height of the footing 175. The spacing and number of spring button locks allows for a variety of discrete heights to be manually selected. The rod 177 and element 178 can be captive so that they do not fully separate from one another. Alternatively, the rod 177 and element 178 can be fully removed from one another.

Figure 2:
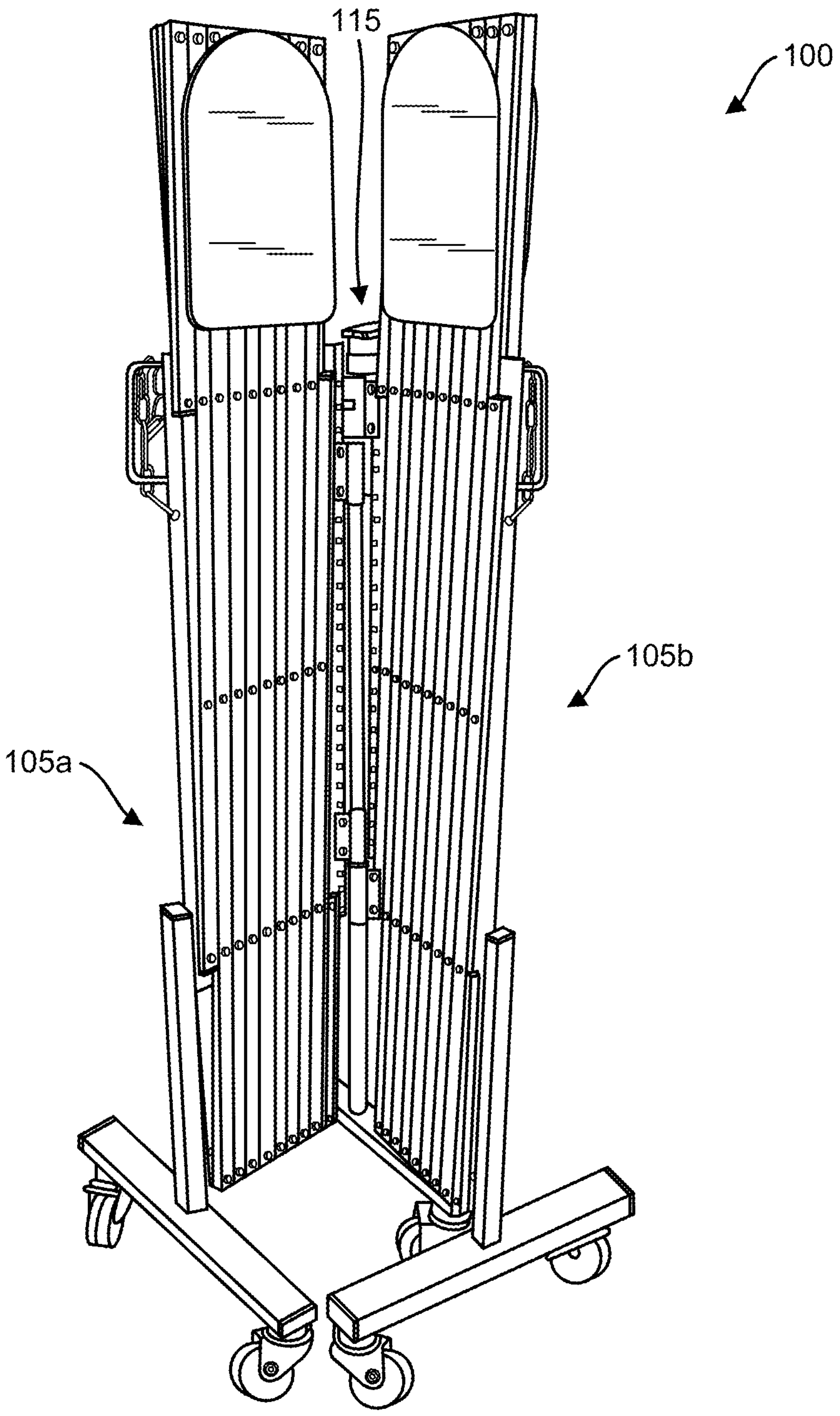
FIG. 2 is a view of a first side of a barrier as in FIG. 1 in a collapsed, articulated configuration where the sign is visible when collapsed.
Figure 3:
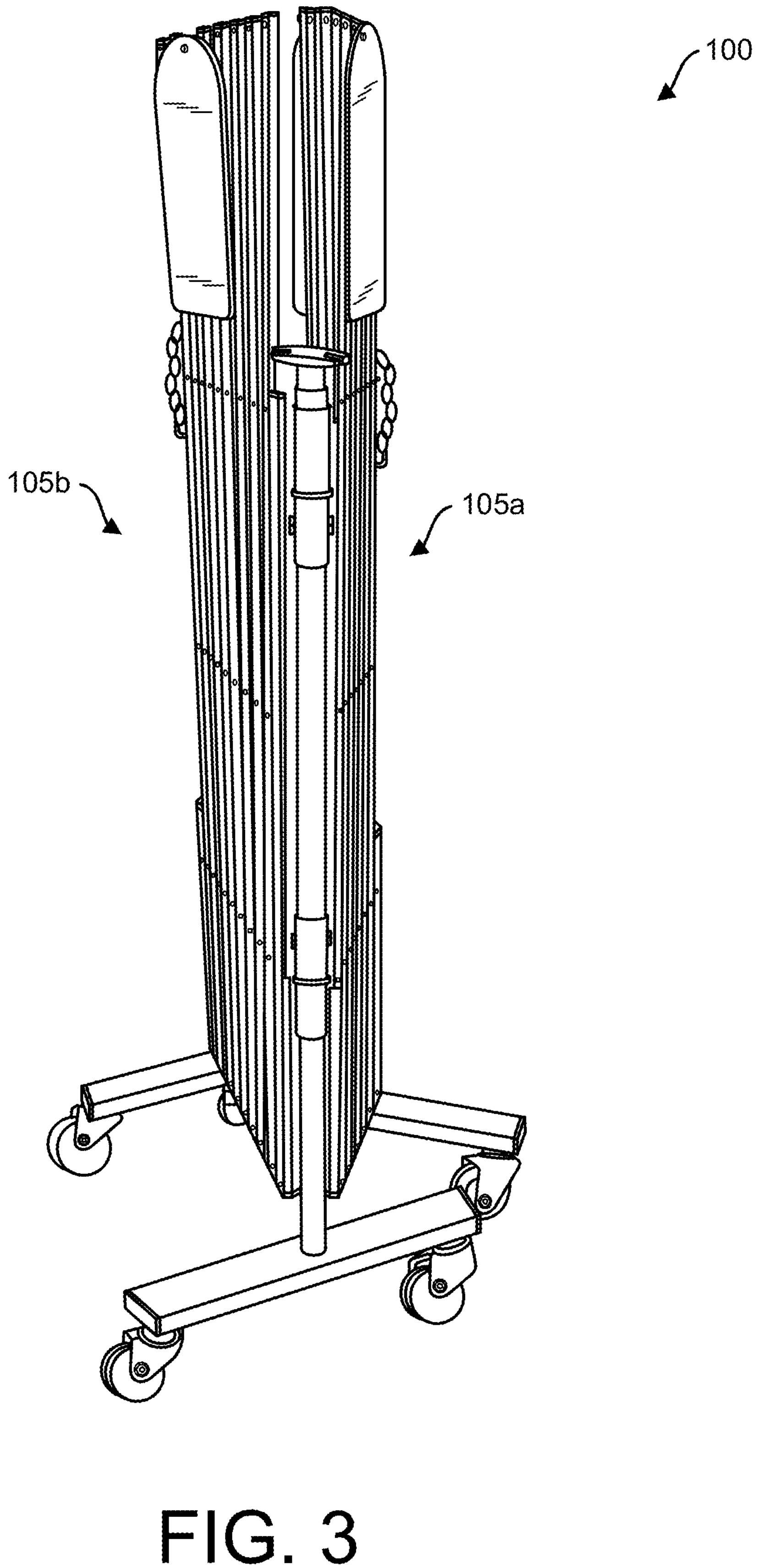
FIG. 3 is a view of a second side of the barrier of FIG. 2 in a collapsed, articulated configuration.

The footing 175 can be a generally t-shaped element as shown in FIG. 10 to provide a low-profile configuration to the barrier 100 when folded up as shown in FIGS. 2 and 3, however it should be appreciated that other stable configurations are considered herein. The footing 175 can incorporate casters 179 to provide ease of movement of the expandable sections 105, for example during expansion of the sections 105 as well as the pivoting of the sections 105 relative to one another along any of a variety of angles (see FIG. 4). The casters 179 can include a lock as is known in the art.

When the barrier 100 is folded into a storage configuration, the angle achieved between the two expandable sections 105*a*, 105*b* for storage can be between about 0 degrees (i.e. folded over onto each other completely), about 10 degrees, about 20 degrees, about 30 degrees, about 40 degrees, about 45 degrees, up to under 180 degrees (i.e. unfolded), as well as any other degree angle in between. Further, the angle achieved between the two expandable sections 105*a*, 105*b* during use can be between about 0 degrees (i.e. folded over onto each other completely), 45 degrees, 90 degrees, 180 degrees (i.e. unfolded), 270 degrees, approaching 360 degrees (i.e. folded over onto each other completely in the opposite direction), as well as any other degree angle in between. The angle achieved by articulating the expandable sections 105*a*, 105*b* relative to one another allows for the barrier 100 to be used to enclose a variety of geometrically shaped areas depending on how many expandable sections 105 are connected together by the hinge 115. If such a barrier 100 is used in an aisle of a retail store, the aisle can be completely blocked if the barrier sections 105 are extended across the aisle and no relative articulation achieved. The barrier 100 can also be used to block only a portion of the width of the aisle, for example, by articulating one of the sections 90 degrees relative to the other. In a further implementation, three expandable sections 105 are coupled together by hinges 115 such that a triangularly-shaped region can be enclosed. In other implementations, more than three expandable sections 105 are coupled together by hinges 115 such that other geometrically-shaped regions can be enclosed or barricaded.

Figure 11:
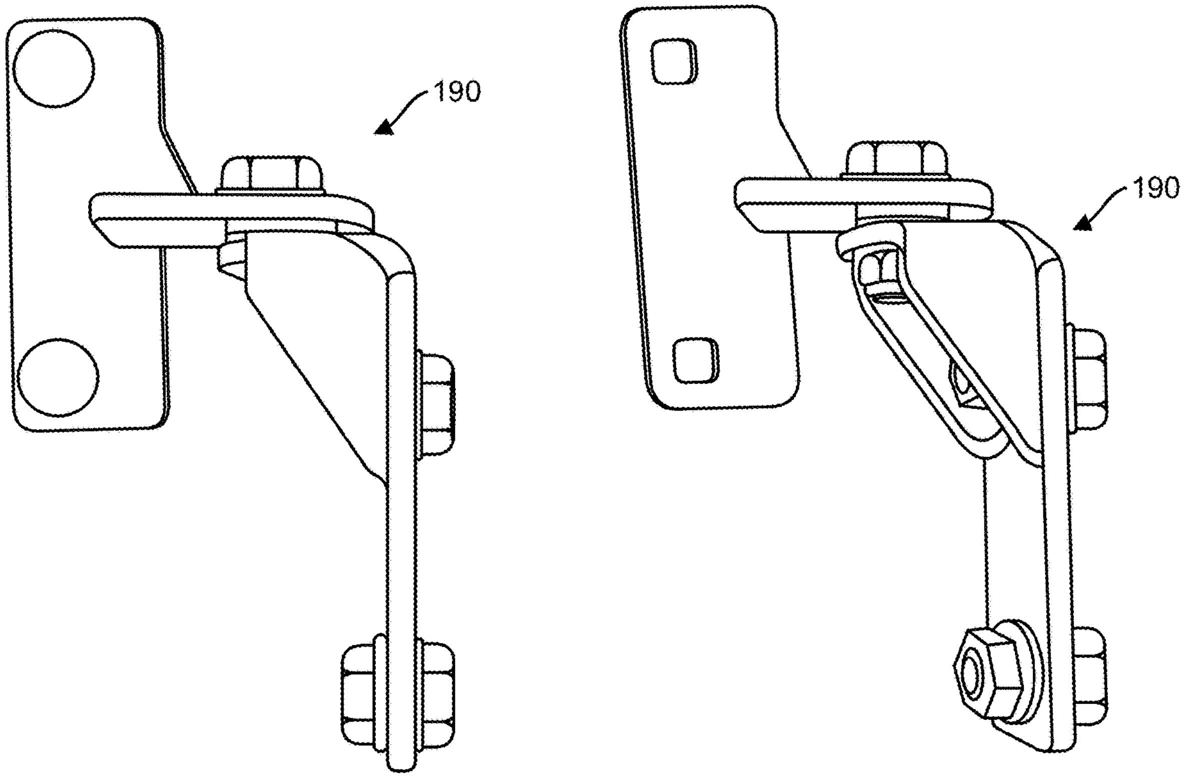
FIGS. 11-12 are perspective views of a connector for use with the barrier of FIG. 1.
Figure 12:
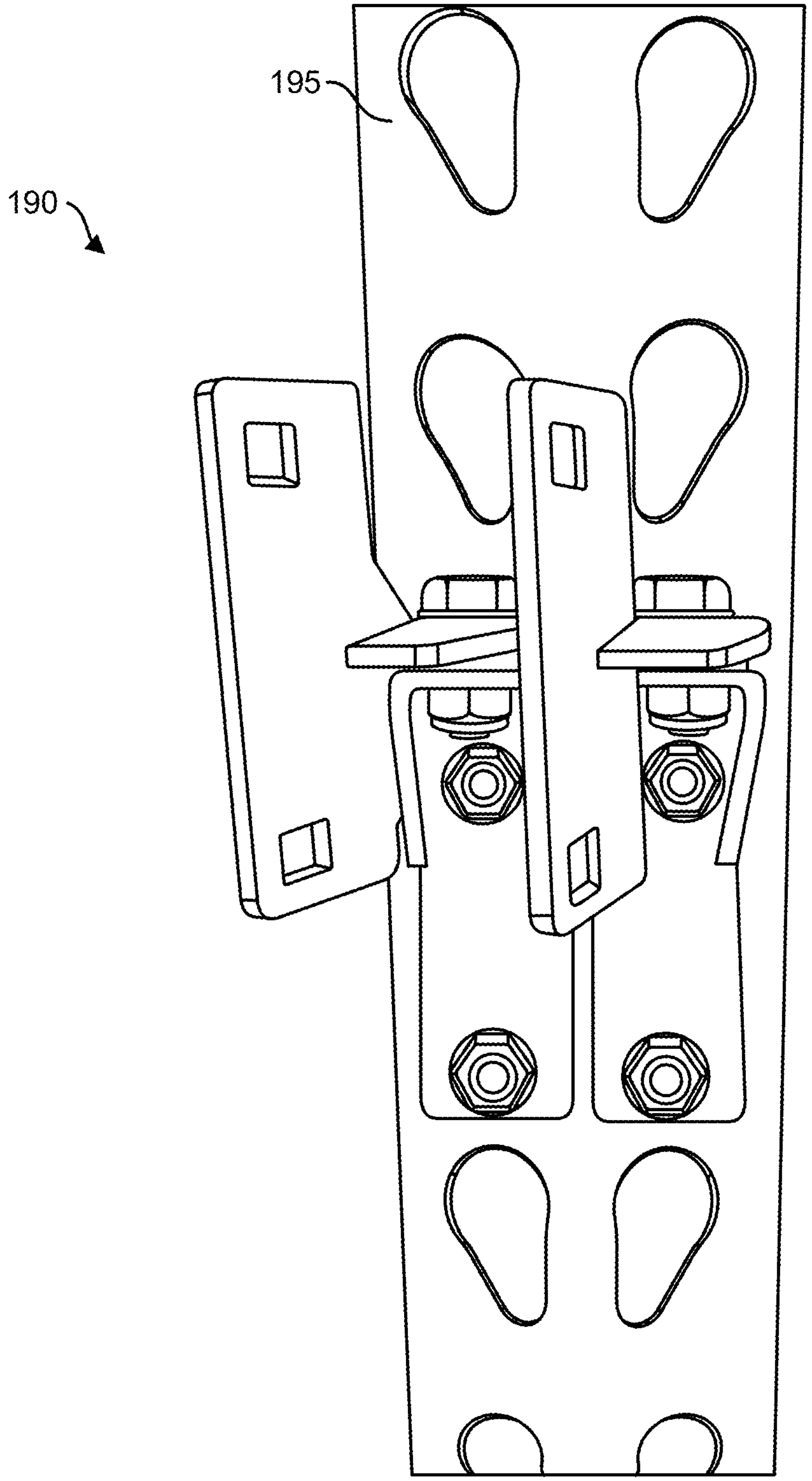

As mentioned above, the barrier 100 can be a completely free-standing barrier or it can be attached and supported on at least a first end to another structure. For example, a first expandable section 105*a* can be coupled to a wall, entryway, or other feature where the barrier 100 is intended to be used and a second expandable section 105*b* can be free-standing such that it incorporates a footing 175. Further, in this implementation, the central post 130 can also incorporate a footing 175. FIGS. 11 and 12 illustrate an implementation of a connector 190 for attached an outer upright 140 to a bracket 195 or other similar element located in the environment within which the barrier 100 is to be used. The configuration of connector 190 can vary and this represents one example. Similarly, it should be appreciated that the environment that the barrier 100 is to be used can vary such that the bracket 195 can be affixed to a wall, doorframe, shelving, or other feature.

The barriers described herein can incorporate any of a number of user-friendly features including one or more signs, sign holders, handles, chains, spring button locks, and/or padlocks, for example, to maintain the collapsed configuration of the barrier 100 when not in use. The barrier 100 may incorporate a sign (or sign holder) 185 that is visible for reading when the barrier is in a particular configuration. For example, the barrier 100 can include a sign 185 coupled to a portion of the barrier 100 so that it is visible for reading only when the barrier 100 is in the collapsed configuration and the slats are not expanded relative to one another. In other implementations, the barrier 100 can include a sign 185 coupled to a portion of the barrier 100 so that it is visible for reading only when the barrier 100 is in the expanded configuration and the slats are expanded relative to one another (see FIG. 4, which will be described in more detail below). In still further implementations, the barrier 100 can include a sign 185 coupled to a portion of the barrier 100 so that it is visible for reading regardless whether the barrier 100 is expanded or contracted. FIGS. 2 and 3 illustrate a sign 185 that is visible and readable when the barrier 100 is in the collapsed configuration, for example, when being stored that is also readable when the barrier 100 is expanded.

Figure 4:
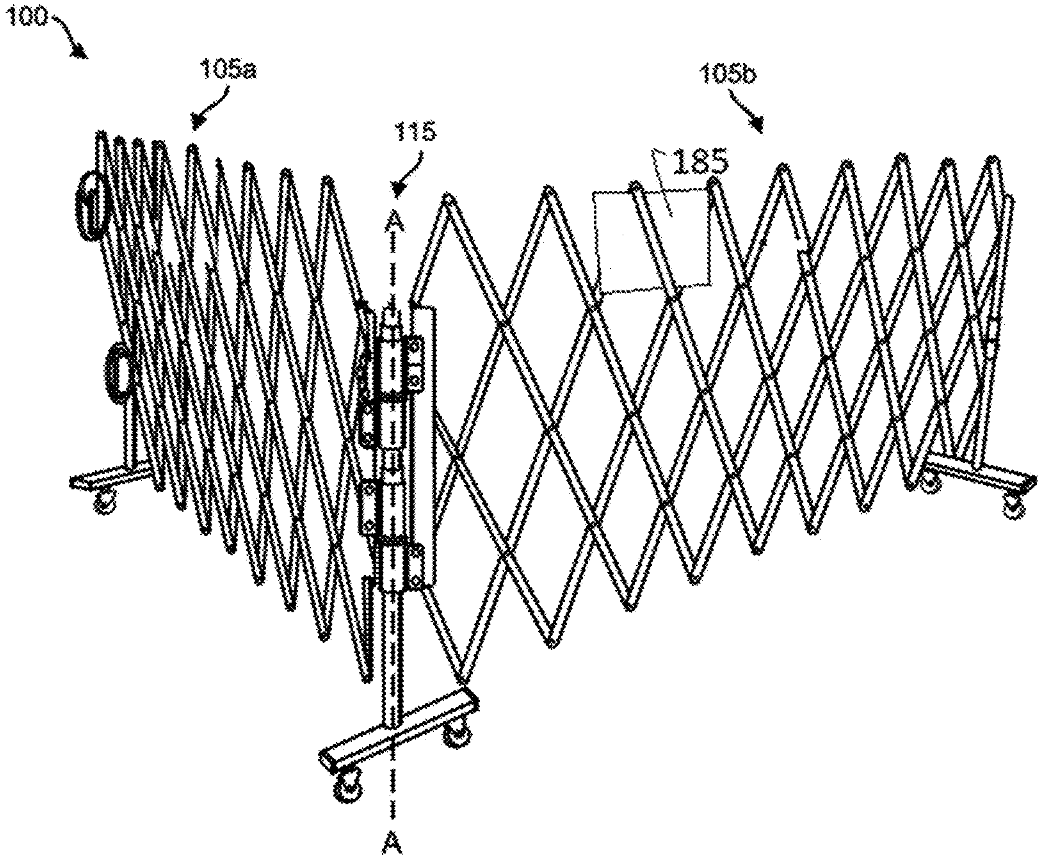
FIG. 4 is a view of the barrier of FIG. 1 in an expanded, articulated configuration with a sign visible when expanded that was invisible when collapsed as in FIG. 1.

FIG. 4 shows a sign or a holder for a sign 185 coupled to the barrier 100 so that the message of the sign 185 is invisible or obscured by the multiplicity of slats when the expandable section 105 to which it is coupled is in the compact, collapsed narrow configuration. The message of the sign 185 can be revealed or visible only when the expandable section(s) 105 is expanded for use as a barrier. As described above, the slats 120 undergo scissor action due to the couplings 170 between pairs of neighboring slats 120 at their upper and lower ends. A first pair of slats can be coupled at their upper ends by a first coupling 170. One of the first pair of slats can be positioned behind the second of the first pair of slats 120. A second pair of slats can be coupled at their lower ends of a second coupling 170. The second slat of the first pair of slats 120 can be positioned behind the next slat 120 and the slats 120 coupled together at their lower ends and so on. The result is that the slats 120 can be positioned alternatingly in front and behind one another so that together they define a space between the front slats and the back slats. The sign 185 can resign within this space between the front slats 120 and the back slats 120 completely enveloped within the lattice of the slats 120. When the expandable section 105 is in the narrow configuration, the slats 120 can be arranged parallel to one another and so that the edges of the front slats 120 abut one another and the edges of the back slats 120 abut one another. The slats 120 in this configuration block the view of the sign 185. When the expandable section 105 is in the expanded, wide configuration, the edges of neighboring slats 120 are separated from one another forming an open lattice structure. The separated slats 120 reveal the sign 185 positioned within the space between the back and front slats so that the slats 120 no longer block or obscuring a view of the sign's 185 message. The sign 185 can be formed of a material such as plastic or metal having a thickness that is sized to fit within the space between the scissoring front and back slats. The sign 185 can have a rigidity sufficient to maintain its position within this space without inadvertently getting caught between the slats 120 during the scissoring action. In other implementations, the sign 185 is a flexible material that is strung between the neighboring slats 120 so that the material folds together when the slats are collapsed preventing the sign 185 from being read and the material unfolds and becomes taut when the slats are expanded so the information on the sign 185 can be read. Reference made herein to a "sign" is not intended to be limiting to any particular informational label configuration and can include plastic, metal, paper, fabric or other sort of material and can also include a sign holder or placard to support a sign rather than being the sign with information itself.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed is:

1. An adjustable safety barrier comprising:

a central hinge having a cylindrical post having a spring button and an axis of rotation;

a first expandable section coupled to the cylindrical post of the central hinge by at least a first connector;

a second expandable section coupled to the cylindrical post of the central hinge by at least a second connector, wherein at least one of the first and second expandable sections is configured to articulate around the axis of rotation of the central hinge forming an articulation angle between the first and second expandable sections, wherein the first connector and the second connector each comprise a tubular knuckle and a leaf extending laterally from the knuckle; and a hinge lock configured to lock, wherein the spring button is received within an aperture of the tubular knuckle of at least one of the first and second connectors preventing articulation around the axis of rotation of the central hinge when the first and second expandable sections are flat against one another in a fully folded configuration and configured to lock when the first and second expandable sections are in a fully unfolded configuration relative to one another and aligned within a single vertical plane.

2. The barrier of claim 1, wherein the cylindrical post extends upright between the first and second expandable sections.

3. The barrier of claim 1, wherein each knuckle has an inner diameter sized to receive an outer diameter of the cylindrical post such that the knuckle is received over the cylindrical post and wherein each leaf is configured to couple to its respective expandable section.

4. The barrier of claim 1, wherein the articulation angle is 0 degrees when the first and second expandable sections are in the fully folded configuration wherein the articulation angle is about 180 degrees when the first and second expandable sections are in the fully unfolded configuration and extend within the single vertical plane.

5. The barrier of claim 1, wherein the barrier is freestanding.

6. The barrier of claim 5, wherein the barrier comprises a first footing coupled to a lower end of the first expandable section, a second footing coupled to a lower end of the second expandable section, and a third footing coupled to a lower end of the cylindrical post.

7. The barrier of claim 6, wherein at least one of the first, second, and third footings is removable from the barrier.

8. The barrier of claim 7, wherein at least one of the first, second, and third footings incorporates casters.

9. The barrier of claim 6, wherein at least one of the first, second, and third footings is adjustable in height.

10. The barrier of claim 9, wherein adjustment in height is via a telescoping spring button lock mechanism.

11. The barrier of claim 1, wherein the first expandable section comprises a first multiplicity of slats hingedly interconnected in a scissoring lattice-type structure configured to expand outward from a compact, collapsed narrow configuration to an expanded, wide configuration and wherein the second expandable section comprises a second multiplicity of slats hingedly interconnected in a scissoring lattice-type structure configured to expand outward from a compact, collapsed narrow configuration to an expanded, wide configuration.

12. The barrier of claim 11, further comprising a third expandable section coupled to the second expandable section by a second hinge.

13. The barrier of claim 1, wherein at least one of the first expandable section and the second expandable section comprises a footing, wherein the at least one of the first expandable section and the second expandable section comprises an inner upright and an outer upright, wherein the outer upright comprises a hollow receiver element comprising a channel extending through at least a portion of its length, the hollow receiver element comprising one or more apertures through one or more walls of the receiver element into the channel.

14. The barrier of claim 13, wherein the at least one of the first expandable section and the second expandable section is coupled to the inner upright on a first side and the outer upright on a second side.

15. The barrier of claim 14, wherein the at least one of the first expandable section and the second expandable section further comprises a first multiplicity of slats extending between the inner upright and the outer upright, the first multiplicity of slats hingedly interconnected in a scissoring lattice-type structure configured to expand outward from a compact, collapsed narrow configuration to an expanded, wide configuration.

16. The barrier of claim 14, wherein the footing comprises a rod extending upwardly and configured to be received into and coupled to lower end region of the channel in the hollow receiver element of the outer upright, wherein the footing is coupled to the outer upright by a height adjustment feature configured to change a height of the footing relative to the outer upright.

17. The barrier of claim 16, wherein the height of the footing is decreased when the rod of the footing is urged further within the channel and the height of the footing is increased when the rod of the footing is urged further outside the channel.

18. The barrier of claim 17, wherein the rod comprises a spring button sized and shaped to mate with and extend through the one or more apertures in the receiver element.

19. The barrier of claim 18, wherein the spring button is biased outward to project through the one or more apertures.

* * * * *